Figure 1:
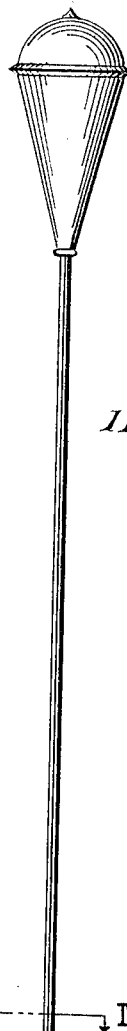

J. PRZYBYTKA.
HAT PIN POINT PROTECTING DEVICE.
APPLICATION FILED OCT. 28, 1912.

1,089,867.

Patented Mar. 10, 1914.

WITNESSES

INVENTOR
J. Przybytka
ATTORNEYS

UNITED STATES PATENT OFFICE.

JOZEF PRZYBYTKA, OF SAYREVILLE, NEW JERSEY.

HAT-PIN-POINT-PROTECTING DEVICE.

1,089,867.  Specification of Letters Patent.  Patented Mar. 10, 1914.

Application filed October 28, 1912.  Serial No. 728,110.

*To all whom it may concern:*

Be it known that I, JOZEF PRZYBYTKA, a subject of the Czar of Russia, residing at Sayreville, in the county of Middlesex and State of New Jersey, have invented certain new and useful Improvements in Hat-Pin-Point-Protecting Devices, of which the following is a specification, reference being had therein to the accompanying drawing.

This invention relates to a hat pin point protecting device, and the objects of my invention are, first, to provide a simple and inexpensive device that can be easily and quickly mounted upon the pointed end of a pin to prevent pedestrians and others from being injured thereby; second, to provide a strong and durable device of the above type that serves as a lock for preventing a pin from becoming accidentally displaced, and third, to provide a hat pin point protecting device embodying hinged members, a yoke carried by one of said members, and a pivoted cam supported by said yoke for locking said members in engagement with the pointed end of a pin.

I attain the above objects by a mechanical construction that will be hereinafter specifically described and then claimed, and reference will now be had to the drawing, wherein :—

Figure 4:
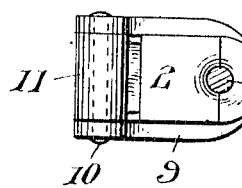
Figure 5:
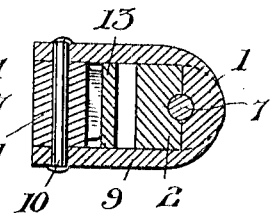
Figure 2:
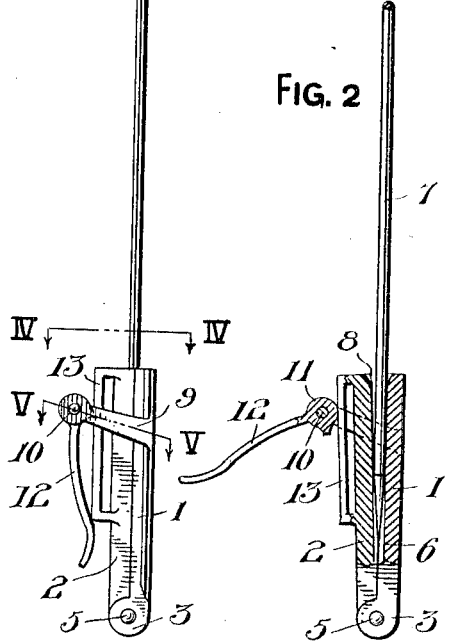
Figure 3:
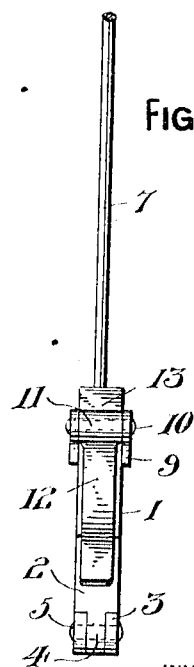

Figure 1 is a side elevation of the hat pin point protecting device, Fig. 2 is a longitudinal sectional view of the same, Fig. 3 is a front elevation of the device, Fig. 4 is an enlarged horizontal sectional view taken on the line IV—IV of Fig. 1, and Fig. 5 is a similar view taken on the line V—V of Fig. 1.

A device in accordance with this invention comprises two hinged confronting members 1 and 2, the member 1 having apertured ears 3 to receive the apertured ear 4 of the member 2, said ears being pivotally connected or hinged together by a rivet or pin 5. The confronting faces of the members 1 and 2 are longitudinally grooved, as at 6 to receive the pointed end of a pin 7 and the inner ends of said members are beveled, as at 8 to facilitate placing the device upon the pointed end of the pin. The member 1, adjacent to the inner end thereof, is provided with an angularly disposed yoke having side arms 9 connected by a transverse pin 10. Pivotally mounted upon the pin 10 is a cam 11 provided with a lever 12 whereby said cam can be easily moved. The cam 11 is adapted to engage a longitudinal strap or wear plate 13 carried by the member 2 and with the lever 12 in engagement with said strap the members 1 and 2 are locked together upon the pointed end of the pin 7.

The device in its entirety can be made of light and durable metal and is susceptible to any desired ornamentation.

What I claim is:—

A hat pin point protecting device comprising a pair of gripping members having the outer ends thereof hinged together and the confronting faces thereof provided with longitudinal grooves for the reception of the pointed end of a pin, a yoke formed of a pair of angularly disposed arms and a pin, said arms integral with the sides of one of said members and extending across the sides and projecting from the other of said members, said pin extending through the free ends of said arms, a longitudinal wear plate integral with and offset with respect to outer face of the said second mentioned member at its inner portion and arranged inwardly with respect to said pin, and a cam pivotally supported by said pin and provided with a lever for actuating the same, said cam having a nose and capable of being shifted to have its nose engage said plate for locking said members in gripping engagement with the pointed end of the pin.

In testimony whereof I affix my signature in the presence of two witnesses.

JOZEF PRZYBYTKA.

Witnesses:
 MARVIN KUDITO,
 WONUVXENISE SZOT.

Copies of this patent may be obtained for five cents each, by addressing the "Commissioner of Patents, Washington, D. C."